Figure 1:
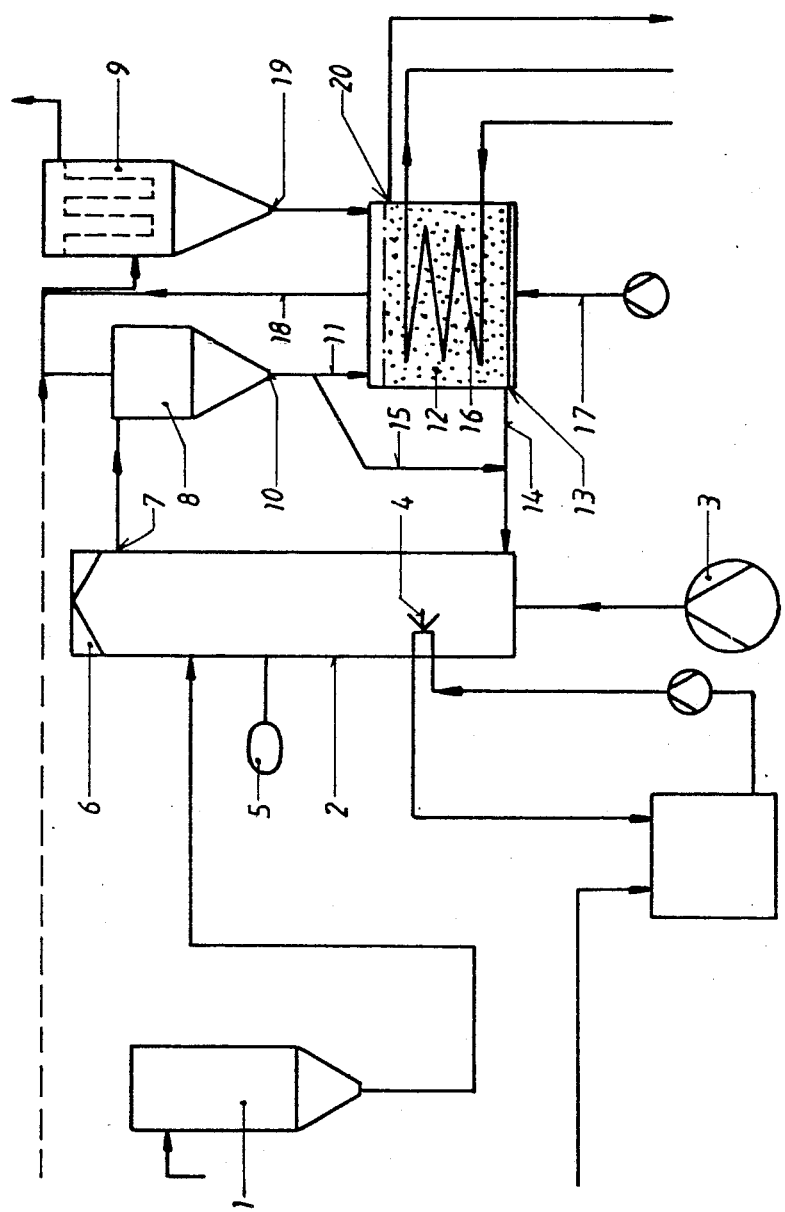

United States Patent [19]

Graf

[11] Patent Number: 4,917,869

[45] Date of Patent: Apr. 17, 1990

[54] LIME HYDRATING PLANT AND PROCESS OF LIME HYDRATING AS WELL AS FLUE GAS DESULFURIZATION PLANT WITH SUCH A LIME HYDRATING PLANT AND PROCESS OF FLUE GAS DESULFURIZATION

[76] Inventor: Rolf Graf, Am Felsenkeller 43, 6382 Friedrichsdorf, Fed. Rep. of Germany

[21] Appl. No.: 213,797

[22] Filed: Jun. 30, 1988

[30] Foreign Application Priority Data

Jul. 1, 1987 [DE] Fed. Rep. of Germany ....... 3721773

[51] Int. Cl.[4] .......................... C01B 6/00; C04B 2/04; C04B 2/08
[52] U.S. Cl. .................... 422/162; 423/242; 423/640
[58] Field of Search ................. 422/162; 423/640, 242

[56] References Cited

U.S. PATENT DOCUMENTS

| | | | |
|---|---|---|---|
| 1,565,107 | 12/1925 | Rich | 423/640 |
| 2,560,016 | 7/1951 | Walker | 423/640 |
| 2,611,683 | 9/1952 | Knibbs | 422/162 |
| 2,833,626 | 5/1958 | Knibbs et al. | 422/162 |
| 3,165,380 | 1/1965 | Warner | 422/162 |
| 4,482,528 | 11/1984 | Emmett | 423/640 |
| 4,636,379 | 1/1987 | Bestek et al. | 423/640 |
| 4,666,690 | 5/1987 | Sommerlad | 423/640 |

FOREIGN PATENT DOCUMENTS

| | | | |
|---|---|---|---|
| 541849 | 6/1957 | Canada | 423/640 |
| 0211458 | 2/1987 | European Pat. Off. | |
| 2116533 | 10/1972 | Fed. Rep. of Germany | |
| 3526008 | 1/1987 | Fed. Rep. of Germany | |
| 234854 | 4/1986 | German Democratic Rep. | 423/640 |

OTHER PUBLICATIONS

Boynton, *Chemistry and Technology of Lime and Lime-Stone*, (1966), John Wiley & Sons, pp. 326–333.
*Trockengeloschtes Kalkhydrat mit grosser Oberflaache—Ein wirksames Reagenz zur Bindung saurer Abgasbestandteile*, Von F. Schmitz et al., (37.Jahrgang)Nr. 10/1984—Zement-Kalk-Gips, pp. 530–533.
*Rauchgasreinigung mit trockenen Sorbentien—Möglichkeiten und Grenzen*, Dr.-Ing. Helmut Michele, Verlag Chemie GmbH, pp. 819–829, (1983).
*Austrustungsnotizen*, Weitere Information cav 223–227, pp. 64, Oct. 1985.

Primary Examiner—Robert L. Stoll
Assistant Examiner—Wayne A. Langel
Attorney, Agent, or Firm—Wegner & Bretschneider

[57] ABSTRACT

A lime hydrating plant is provided with an external cooler 16 in which the rawer solids portion which is recirculated into a return flow fluidizer 2 (hydrater) is cooled outside the hydrater. This means that less water has to be atomized into the return flow fluidizer 2 than by known plants in order to keep the adequate temperature essential for the hydrating process. Thus dew point decrease may be avoided and a highly reactive hydrated lime may be produced.

10 Claims, 3 Drawing Sheets

LIME HYDRATING PLANT AND PROCESS OF LIME HYDRATING AS WELL AS FLUE GAS DESULFURIZATION PLANT WITH SUCH A LIME HYDRATING PLANT AND PROCESS OF FLUE GAS DESULFURIZATION

The invention relates to a lime hydrating plant with a reactor in which lime to be hydrated is transported whereby fluidized air is blown in from below and hydrating water is fed. A solids precipitation with collecting hopper is provided downstream the hydrater. A cooling unit is equiped within the hopper in order to absorb part of the heat which is released during the hydrating process. The invention affects as well a process of lime hydrating, a flue gas desulfurization plant with such a lime hydrating plant and a process of flue gas desulfurization.

A lime hydrating plant in the above mentioned manner is described in DE-OS 21 16 533. In order to keep the temperature during hydrating reaction at a value suitable for the hydrating process, much more water than necessary concerning stoichiometry is fed in the here represented hydrater in form of steam. For the production of this steam water-flown tubes are installed at the bottom within the hydrater. This cooling installation results in an additional temperature reduction.

The known lime hydrating plant proves the disadvantage that the fed water steam partly condenses at the cooling tubes which are cold in comparaison to it. This leads to lime deposits at the cooling tubes which cause pluggings and deposits within the hydrater. Therefore hydraters according to DE-OS 21 16 533 are not usable. That is the reason why present plants which consist of one or several successively connected screw mixers can only keep the temperature low enough by feeding in a sufficient water quantity for the hydrating process.

This leads to a high dew point of the exhaust air whereby solids deposits can easily occur in subsequently connected installations, especially in tubes and chimney and particularly with each starting and stopping operation because of dew point decrease.

As an example a flue gas desulfurization plant with a fluidized bed reactor is described in EP 0 211 458. With the known dry flue gas desulfurization plant hydrated lime of a hydrated lime silo is used. This hydrated lime is produced by means of a specially designated unit in the lime works. The transport and the intermediate storage cause costs and mean that hydrated lime of high reactivity can only be used with considerable surcharge and with technical problems concerning conveyance and storage.

The invention is based on the task to create a lime hydrating plant of the above mentioned method in this manner that the temperature within the hydrater can be kept at a value optimal for the reactivity of the hydrated lime and suitable for the hydrating process without unwelcome high addition of water and without danger of deposits within the hydrater. Furthermore, a process of lime hydrating shall be created which operates with water addition that is as low as possible. Another task of the invention is to set up a flue gas desulfurization plant with such a lime hydrating plant of simple construction and of high desulfurization with minimal lime consumption in order to obtain minimal quantities of residues that have to be treated. A process of flue gas desulfurization with such a plant is also object of the invention.

According to the invention the first mentioned task is solved in this way that a solids return line leads from the collecting tank to the hydrater and that the cooling unit is installed outside the hydrater and is designed for cooling of the returned solids.

This solids return means that the temperature within the hydrater -now designed as return flow fluidizer-can be kept low enough by an external cooling unit without addition of too much water and without danger of deposits within the hydrater. By these means dew point decrease within the hydrater and the following unit parts, especially within the chimney, can be avoided. The temperature of exhaust air of the lime hydrating unit of the present invention has difference of at least 5 degrees Celsius, preferably 15 degrees Celsius, from the water dew point in normal operating conditions. On account of external cooling of return dust the lime hydrating plant of the present invention is also suitable for the building material industry because a sufficient retention time can be realized due to additional dust circulation cycles in order to modify calcium oxide completely to hydrated lime. Due to the solids cooler variably arranged within the cooling line hydrated lime qualities of especially low or high reactivity according to the purpose of use can be produced by free adjustable hydrating temperature and retention time.

The lime hydrating plant is designed particularly simple when the collecting tank is created as fluidization equipment with cooling tubes as cooling installation. The nearly dry fluidization air contributes additionally to the avoidance of water dew point decrease and thus to the avoidance of solids deposits.

It is not necessary to load the fluidization equipment with the total solids quantity which is separated in the raw precipitator if the solids precipitation according to another advantageous design of the invention disposes of a raw precipitation and a following fine precipitation and if a collecting line from the outlet of the raw precipitator leads to the collecting hopper and if a line returns directly to the return flow fluidizer. Due to this partial return of non-cooled solids a relatively small design of the fluidization equipment and a modification of the hydrating temperature is possible.

The exhaust air outlet of the fluidization equipment is connected in an advantageous manner with the inlet of the fine precipitator.

It is also of advantage if the fine precipitator disposes of a hot air connection because the hot air which contains no or only little water and carbon dioxide can be added if necessary in order to improve the operation conditions. Contrary to the level of technics this hot air is fed in a part where the solids portion is limited.

A simple and safe temperature control of the hydrater is possible by water quantity inlet if the lime input in the hydrater takes place above a temperature sensor that controls the water input in the hydrater.

The hydrater designed as return flow fluidizer operates with more efficiency if it disposes of a prededuster at the upper end in order to diminish the solids loading of the solids precipitation. Thus the dust loading of the following solids precipitation is also reduced. Even very simple prededuster may retain about 50% of the solids.

The advantages of this process result from the explanations of the lime hydrating plant.

The task to create a flue gas desulfurization plant as simple and effective as possible is solved by a direct conjunction between the hydrated lime outlet of the line hydrating plant and the hydrated lime inlet of the return flow fluidizer of the flue gas desulfurization plant. Such a flue gas desulfurization plant may operate fully automatic. Consequently it is especially suited for the use in power stations and central heating plants. The intense return flow of the solids results in better conditions for the removal of acid gases, especially of sulfur dioxide within the return flow fluidizer.

An adaption to power station's different capacities is also possible without a bigger buffer storage for the hydrated lime if the lime hydrating plant consists at least of two parallelly connected lime hydrating units, one of these conjuncted directly with the flue gas desulfurization plant and the other connected with the flue gas desulfurization plant by a hydrated lime storage.

Such an unit enables an on-line operation in which a particularly reactive hydrated lime may be used to 100% for sulfur dioxide precipitation. The hydrated lime can be loaded with more water than hydrated lime which has to be stored in intermediate deposits and which has to be transported.

A price reduction of the total unit is possible if the exhaust air outlets of the lime hydrating plant are led according to another design of the invention to the absorber of the flue gas desulfurization unit.

This process is able to operate with a high degree of efficiency and leads to minor residue quantities.

The invention allows various forms of design. For further illustration of its basic principle, a lime hydrating plant and two different flue gas desulfurization plants are schematically shown in the drawing and described in the following. In the drawing are shown FIG. 1 a flow diagram of a lime hydrating plant according to the invention FIG. 2 a flow diagram of a flue gas desulfurization plant with a lime hydrating plant according to the invention FIG. 3 a block diagram of a second flue gas desulfurization plant design with two lime hydrating units FIG. 1 shows a silo 1 for the storage of calcium oxide in form of line. This fine lime is led to a hydrater 2 constructed as return flow fluidizer, preferably to the upper part. By means of a fan 3 fluidized air comes to the hydrater 2 from below in order to produce a fluidized stream. Above the fluidized air inlet a water nozzle 4 is provided which is controlled by a temperature sensor 5. This temperature sensor 5 is located in the upper part of the hydrater 2. The hydrater 2 preferably operates with hydrating temperatures below 65 degree Celsius. In the hydrater hydrated lime with specific surfaces, preferably above 20 m$^2$/g, generally above 30 m$^2$/g, can be produced.

At the head of the hydrater 2 a prededuster 6 is provided from which the lime dust loaded air leaves the hydrater 2 through an outlet 7. This air is then prededusted in a raw precipitator 8, preferably designed as cyclone separator. A fine precipitator 9 is connected behind the raw precipitator 8. This fine precipitator 9 can e.g. be a bag house (filter) or an electrostatic filter. The raw precipitator 8 has an outlet 10 which is connected with the collecting hopper 12 by a line 11. This collecting hopper 12 is a fluidization equipment. At its outlet 13 a solids return line 14 leads to the lower part of the hydrater 2. A bypass line 15 branches off from line 11 before it reaches the collecting hopper 12 and leads to the hydrater 2 by avoiding the collecting hopper 12.

Important for the invention is that a cooling installation 16 in water steam free atmosphere-in this example designed as water-flown cooling tubes in the collecting hopper-is located in the collecting hopper 12 or in another part of the solids return. The fluidized air is led from below to the collecting hopper 12 by a line 17 and leaves the collecting hopper 12 at its upper part by a line 18 which directs to the fine precipitator 9.

The fine precipitator 9 has an outlet 19 which is also connected with the collecting hopper 12. The collecting hopper 12 has a second outlet 20 at which the hydrated lime that has to be produced is taken out.

Figure 2:
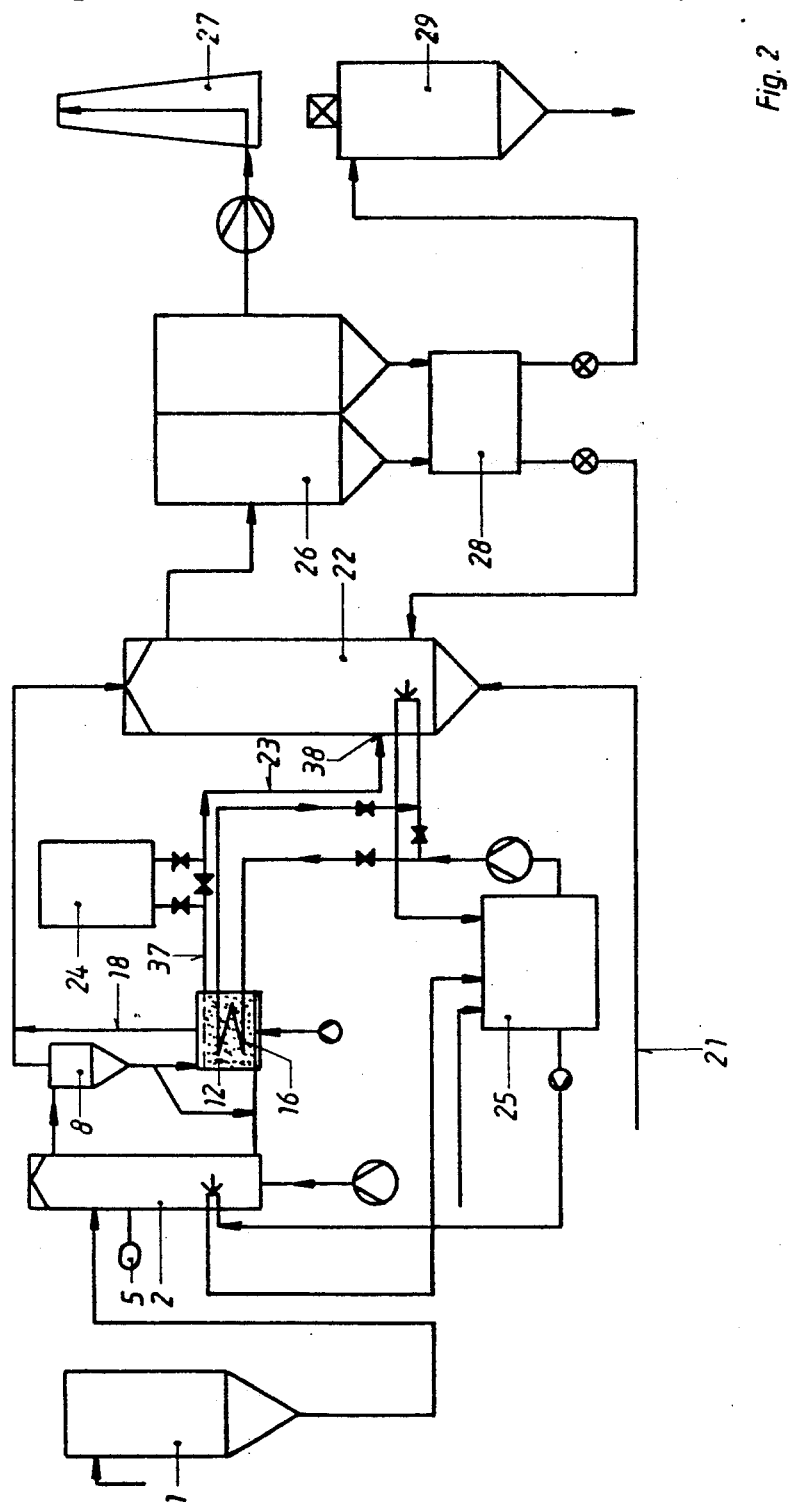
Figure 3:
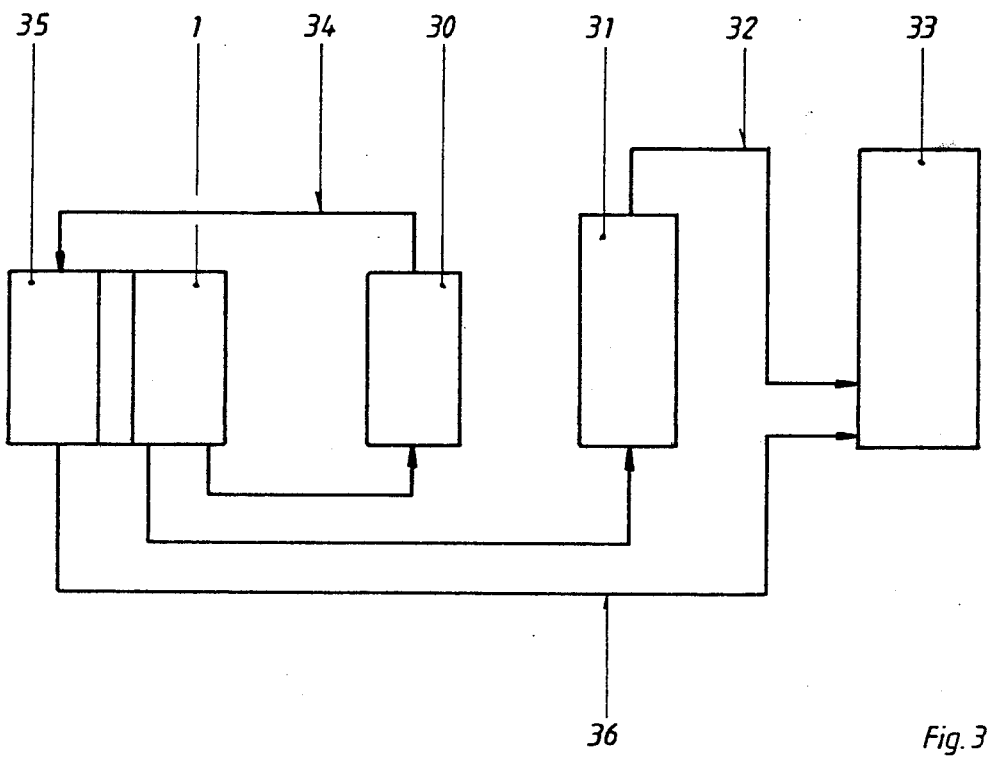

According to FIG. 2 a lime hydrater modified in comparison with FIG. 1 is part of a flue gas desulfurization plant. In accordance with the lime hydrater of FIG. 1 a hydrater 2 in form of a return flow fluidizer is again provided with a successively connected raw precipitator 8. The solids precipitated therein are fed back to the hydrater 2, in part directly, partly in cooled form by means of the cooling equipment 16 through the collecting hopper 12 designed as fluidization equipment.

A fine precipitator 9 is not necessary for the lime hydrating plant according to FIG. 2. The exhaust air of the collecting hopper 12 designed as fluidization unit is led to the flue gas desulfurization plant instead of the fine precipitator, for example into the absorber 22 or in a flue gas line 21 leading fluidization air to the absorber 22. The hydrated lime produced in the lime hydrating plant is fed directly into the hydrated lime inlet 38 of the absorber 22 by a line 23 which comes from the hydrated lime outlet 37 of the collecting hopper 12. Capacity fluctuations may be compensated by a buffer storage 24 which is connected in line 23.

FIG. 2 shows furthermore a water tank 25 from which the water is atomized and pumped in the absorber 22. This water may first of all flow through the cooling unit 16 in order to warm up. As usual with flue gas desulfurization plants a dust precipitator 26 is connected behind the absorber 22 so that desulfurized and dedusted flue gas reaches the chimney 27. The dust deposited in the dust precipitator 26 comes first of all to an intermediate storage 28 and is then partly led back to the absorber 22 and partly fed back into the residue silo 29.

The block diagram 3 shows that two lime hydrating units 30, 31 of different capacity may be parallelly arranged behind a calcium oxide tank 1. The lime hydrating unit 31 is designed for base load operation. The high reactive hydrated lime produced in it is led directly to a flue gas desulfurization plant 33 by a line 32. The lime hydrating unit 30 is provided for peak load operation. Hydrated lime of normal reactivity is fed by a line 34 to a hydrated lime silo 35 from where it can be led, if necessary, to the flue gas desulfurization unit 33 by a line 36.

| List of the used reference symbols | | | |
|---|---|---|---|
| 1. | Silo | 21. | Flue gas line |
| 2. | Hydrater | 22. | Absorber |
| 3. | Fan | 23. | Line |
| 4. | Water nozzle | 24. | Buffer storage |
| 5. | Temperature sensor | 25. | Water tank |
| 6. | Prededuster | 26. | Dust precipitator |
| 7. | Outlet | 27. | Chimney |
| 8. | Raw precipitator | 28. | Intermediate hopper |
| 9. | Fine precipitator | 29. | Residue silo |
| 10. | Outlet | 30. | Lime hydrating unit |
| 11. | Line | 31. | Lime hydrating unit |
| 12. | Collecting hopper | 32. | Line |
| 13. | Outlet | 33. | Flue gas desulfurization plant |
| 14. | Return line | 34. | Line |

List of the used reference symbols

| | | | |
|---|---|---|---|
| 15. | Bypass line | 35. | Hydrated lime storage |
| 16. | Cooling unit | 36. | Line |
| 17. | Line | 37. | Hydrated lime outlet |
| 18. | Line | | |
| 19. | Outlet | | |
| 20. | Outlet | | |

I claim:

1. A lime hydrating plant, comprising:
a hydrator
means for injecting air and water into said hydrator to form a hydrated lime product,
means for precipitating solids from said product,
means for collecting said solids from said precipitating means, and
means for cooling said solids within said collecting means, wherein a line is positioned between said collecting means and said hydrator for returning cooled solids to said hydrator.

2. A hydrating plant according to claim 1, wherein said collecting means is a fluidization unit.

3. A hydrating plant according to claim 1,, wherein said precipitating means includes a raw precipitator and a fine precipitator.

4. A hydrating plant according to claim 1, wherein the collecting means includes an outlet for sending exhaust air to a fine precipitator.

5. A hydrating plant according to claim 3, wherein a hot air line is connected to said fine precipitator.

6. A hydrating plant according to claim 1, including means for controlling temperature of the water injected into said hydrator.

7. A hydrating plant according to claim 2, said hydrator includes a prededuster.

8. A combination lime hydrating and desulfurization plant, comprising:
a hydrator
means for injecting air and water into said hydrator to form a hydrated lime product,
means for precipitating solids from said product,
means for collecting said solids from said precipitating means, and
means for cooling said solids within said collecting means, wherein a line is positioned between said collecting means and said hydrator for returning cooled solids to said hydrator,
an absorber for desulfurizing flue gas generated as a by-product of the hydrated lime product.

9. The plant of claim 8, including a second hydrator connected in parallel to said hydrator, and wherein said second hydrator is connected to a hydrated lime storage vessel.

10. The plant of claim 8, including an exhaust air conduit connecting the collecting means and the absorber.

* * * * *